May 12, 1942.　　　K. R. HERMAN ET AL　　　2,282,472

HYDRAULIC BRAKE

Filed Oct. 23, 1939

INVENTORS
KENNETH R. HERMAN &
RALPH L. TWEEDALE
BY
*Ralph L. Tweedale*
ATTORNEY

Patented May 12, 1942

2,282,472

UNITED STATES PATENT OFFICE 2,282,472

HYDRAULIC BRAKE

Kenneth R. Herman and Ralph L. Tweedale, Detroit, Mich., assignors to Vickers Incorporated, Detroit, Mich., a corporation of Michigan Application October 23, 1939, Serial No. 300,780

6 Claims. (Cl. 60—54.5)

This invention relates to power transmissions, particularly to those of the type comprising two or more fluid pressure energy translating devices, one of which may function as a pump and another as a fluid motor.

The invention is more particularly concerned with a power transmission system for transmitting motion from one point to another as, for example, between the brake pedal and brake shoes of a vehicle. Directly-operated, hydraulic braking systems have come into wide use in vehicles and have entirely replaced mechanically actuated systems for this purpose due to the simplicity, reliability and automatic equalization inherent in the usual hydraulic braking system.

In larger vehicles, particularly large airplanes, where the force required to operate the brake shoe is very high, no completely satisfactory method of transmitting force from the brake pedal to the brake shoe has heretofore been available. While it is readily possible by proper choice of the relative displacement between the brake cylinder and the master cylinder to amplify the manual effort applied to the brake pedal as many times as may be desired and to thus produce requisite brake force at the shoe, there is a practical limit to the "leverage" which may thus be applied due to the fact that, as the force amplification is increased, the motion at the pedal relative to that at the shoes is increased. Since it is necessary to provide a certain minimum clearance at the shoes when the brakes are released, it becomes impractical to provide sufficient leverage to operate very large brakes by a direct hydraulic system without having the pedal travel become entirely excessive. Various systems have been proposed for getting around this difficulty, among them being the use of so-called compensating valves which act to regulate the pressure applied to the brake cylinder from an external source of pressure fluid such as a pump or accumulator. Systems of this character, while satisfactory in many respects, present certain difficulties in that they cannot be made as sensitive to small changes in pedal pressure as the directly-operating hydraulic system.

It is accordingly an object of the present invention to provide a power transmission system for operating vehicle brakes or the like in which the application of brake pressure is controlled directly by the operator's foot pressure against a solid column of liquid extending to the brake cylinder wherein a large force amplification may be obtained without excessive pedal travel and to provide in such a system a power-operated means for initially displacing a predetermined quantity of liquid into the brake cylinder which quantity is insufficient to effectively apply the brakes but, nevertheless, is great enough to take up at least a major portion of the shoe clearance by power means. Thus the direct hydraulic part of the system is required only to do the actual force application after the slack or clearance in the shoes has been taken up by the power means.

Further objects and advantages of the present invention will be apparent from the following description, reference being had to the accompanying drawing wherein a preferred form of the present invention is clearly shown.

Figure 3:
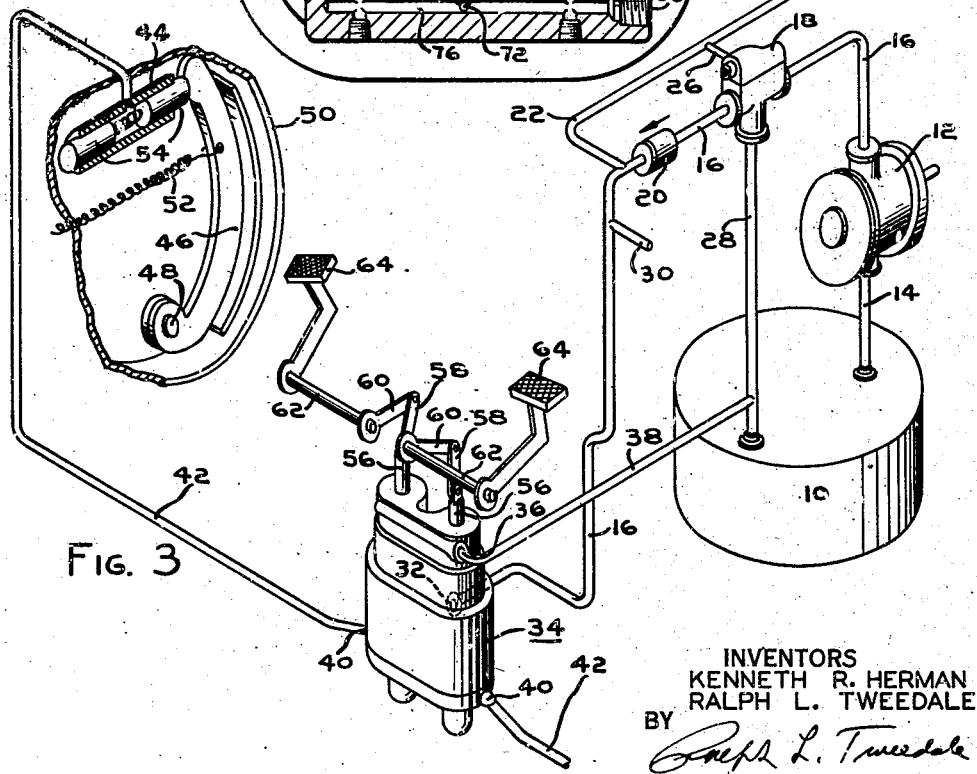
Figure 3 is a diagrammatic view of a complete power transmission system incorporating the valve illustrated in Figures 1 and 2.

Referring first to Figure 3, there is shown a power transmission system suitable for use in large aircraft and comprising a tank 10 for oil or other suitable power transmission liquid. A pump 12 driven by the aircraft engine or other suitable prime mover has a suction conduit 14 for withdrawing oil from the tank 10 and a delivery conduit 16 which extends to and through an unloading valve 18 and through a check valve 20. A branch pipe 22 connects from the line 16 beyond the check valve 20 to an air-bottle accumulator 24. The unloading valve 18 is controlled in accordance with the pressure in accumulator 24 by means of a branch conduit 26, and when the accumulator pressure rises to a predetermined value, the valve 18 opens, bypassing the full discharge of the pump to the tank through a bypass conduit 28. A branch conduit 30 may lead to other hydraulically-operated devices such as are customarily provided in large aircraft. The portion of the system thus far described forms per se no part of the present invention and is intended as an illustration of a typical hydraulic pressure system with which the present invention may be suitably associated.

The conduit 16 terminates at a pressure port 32 of a duplex master cylinder mechanism generally designated as 34. The latter has a tank port 36 which connects by a conduit 38 with the tank 10 and is also provided with a pair of motor ports 40 which connect by conduits 42 with a motor or brake cylinder 44 of the vehicle brake. The latter is also illustrated diagrammatically as comprising a pair of shoes 46 pivoted at 48, only one of which is illustrated, and adapted to be moved outwardly into engagement with a drum 50 against a spring 52 whenever oil is admitted to the brake cylinder 44. For this purpose the cylinder is provided with two pistons 54 projecting from opposite ends of the cylinder 44 and in engagement with the two brake shoes 46.

The master cylinder 34 is provided with two operating stems 56 projecting from the top end thereof which are connected by links 58 with levers 60 carried by independent brake pedal shafts 62. The latter each carries a brake pedal 64 which, when depressed, is adapted to depress its corresponding stem 56.

Figure 1:
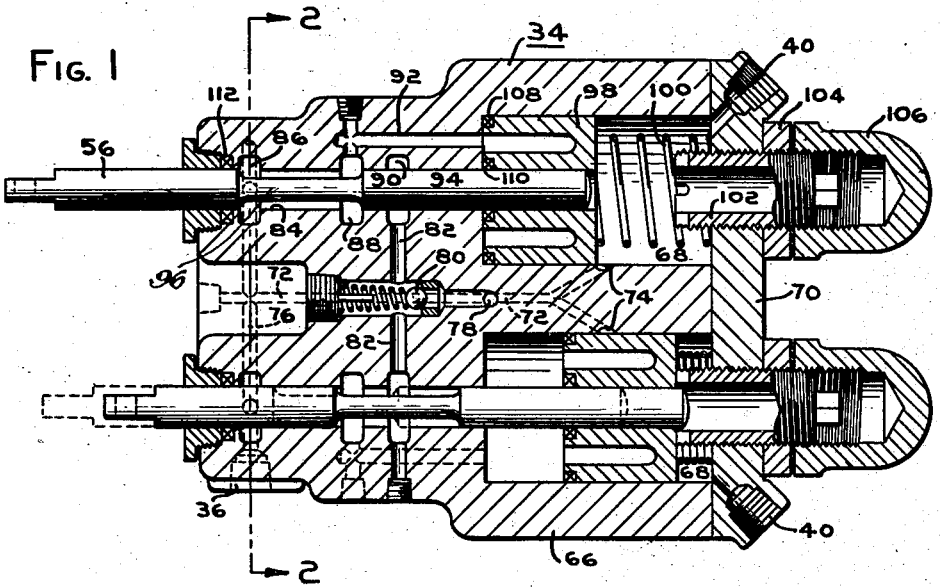
Figure 1 is a longitudinal section through a duplex master cylinder construction embodying a preferred form of the present invention.
Figure 2:
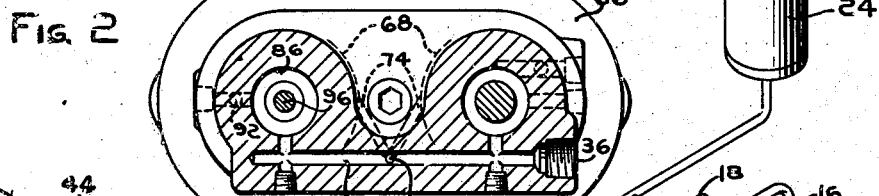
Figure 2 is a cross section on line 2—2 of Figure 1.

Referring now to Figures 1 and 2, the internal construction of the master cylinder 34 is there illustrated. A body 66 is provided with two master cylinders 68 at its right-hand or lower end, which cylinders are closed by an end cap 70 in which the motor ports 40 are formed. Centrally within the body 66 at one side thereof there is formed a longitudinal bore 72 which branches at its lower end to communicate with openings 74 in the master cylinders 68 near the left-hand end thereof. At its left-hand end the bore 72 joins with a transverse bore 76, one end of which communicates with the tank port 36. Also centrally located within the body 66 is a passage 78 communicating between the pressure port 32 and a check valve 80. On its outlet side the check valve 80 communicates with two branch conduits 82 extending transversely of the body 66.

The operating mechanisms associated with master cylinders 68 are identical so that a description of one of them will suffice for the other. A longitudinal bore 84 extends from the upper end of the body 66 to the master cylinder 68 and is coaxial therewith. The bore is provided with a tank port 86, a cylinder port 88, and a pressure port 90, each of which is formed as an annular enlargement in the bore 84. The port 86 communicates with the transverse tank passage 76 while the port 90 communicates with the transverse pressure passage 82. The port 88 communicates by a conduit 92 with the closed end of the master cylinder 68.

Slidably mounted in the bore 84 is a plunger 94, the right-hand end of which projects into the master cylinder and forms the customary master piston similar to that of the conventional direct hydraulic brake system. Intermediate its ends the plunger 94 is provided with a reduced portion 96 acting as a valve to selectively control communication of port 88 with either port 86 or port 90. At its upper end the plunger 94 has integrally formed therewith the projecting stem 56 which is connected to the pedal-operated linkage.

Slidably mounted in the master cylinder 68 is an annular piston 98 having its outer cylindrical surface sliding in the master cylinder and its inner cylindrical bore receiving the master piston 94. A spring 100 normally urges the piston 98 to the left in Figure 1. The end cap 70 is provided with an adjustable stop sleeve 102 having a suitable lock nut 104 and cap nut 106 whereby the right-hand limit of the stroke of the piston 98 in Figure 1 may be varied. Suitable sliding seals 108 and 110 are provided at the outer and inner surfaces of the piston 98 adjacent the left-hand end thereof. Likewise a similar seal 112 is provided at the end of the bore 84 through which stem 56 projects.

In operation, the normal or idle position of the master cylinder mechanism is illustrated in the upper half of Figure 1. In this position the reduced portion 96 connects port 88 with port 86 so that the space on the left-hand side of piston 98 is connected to tank through conduit 92, bore 84, conduit 76 and port 36. The spring 100 is accordingly free to maintain the piston 98 in the position illustrated.

When it is desired to apply one or the other of the brakes the corresponding pedal 64 is depressed and, during its initial travel, moves the plunger 94 to the position illustrated by dotted lines in the lower half of Figure 1. In this position the port 88 is cut off from the tank port 86 and is opened to communicate with the pressure port 90. This accordingly admits pressure fluid from the delivery conduit 16 through port 32, passage 78, check valve 80, passage 82, bore 84 and passage 92 to the space behind the piston 98. The latter is accordingly projected to the right in Figure 1 to the full extent of its stroke as determined by the stop 102. This movement displaces oil from the master cylinder 68 out through the motor port 40 and through conduit 42 to the brake cylinder 44. The quantity of oil thus displaced, however, is preferably only sufficient to take up the necessary clearance between the shoe and the drum but is insufficient to bring the shoe into contact with the drum with any significant force. Since the piston 98 is in abutment with the stop 102, the pressure from the accumulator 24 is no longer effective on the oil within the master cylinder 68 and brake line 42.

Further inward movement of the plunger 94 displaces oil to the brake cylinder 44 in the conventional manner so that the pressure produced in the brake cylinder is exactly proportional to the pressure applied to the pedal. In this way the operator has the same "feel" at the brake pedal as he would have with a conventional direct hydraulic braking system, and the pedal may be pressed harder or slightly released as desired to control the braking force.

Upon retraction of the plunger 94 to the position illustrated in the upper half of Figure 1, the retraction of the plunger itself releases the brake shoe from any pressing engagement with the brake drum, and as soon as the port 88 is opened to the port 86 the space behind the piston 98 is again connected to tank permitting the spring 100 to return the piston 98. Thus the brake shoe spring 52 forces back the brake piston 54 returning the shoe to its normal inoperative position.

It will be understood that the pressure setting of the unloading valve 18 must be sufficiently high so that the pressure behind piston 98 when the brake is applied cannot be overcome by any pressure which may be developed in master cylinder 68 under the maximum pedal pressure which may ever be applied. In this manner it is assured that even though the pedal be depressed extremely quickly so as to move past the dotted-line position in Figure 1 before piston 98 completes its stroke, tthe latter will continue to move thus building up pressure in the master cylinder and, if necessary, forcing the operator's foot back. Thus the pressure effective on the brake shoe is at all times determined by the pressure which the operator exerts on the brake pedal.

It will also be understood that the relative displacement between plunger 94 and brake cylinder 44 is such as to produce a large amplification of force at the brake shoe. On the other hand, the relative displacement between the piston 98 and brake cylinder 44 is such as to produce a lesser amplification of force and may, in fact, be a negative force amplification if design conditions are such as to require it. The total displacement of the piston 98, however, is less than the total displacement required to fully actuate the brake cylinder 44. This total displacement of the piston 98 is readily adjusted by changing the position of the adjustable abutment 102 which, in fact, forms a convenient means of brake adjustment at the master cylinder.

The opening 74 and passage 72 provide communication between the master cylinder and the tank port 36 when the piston 98 is in its fully retracted position. Thus the quantity of liquid in the master cylinder 68, brake line 42 and brake cylinder 44 is maintained constant, and any accumulation of air is permitted to escape to tank.

While the form of embodiment of the invention as herein disclosed constitutes a preferred form, it is to be understood that other forms might be adopted, all coming within the scope of the claims which follow.

What is claimed is as follows:

1. In a hydraulic motion transmitting system for brakes or the like the combination of a motor cylinder for applying the brake, a source of fluid under pressure higher than the maximum ever required at the motor cylinder, a master cylinder in closed communication with the motor cylinder, manually-actuated means to displace fluid from the master cylinder, valve means rendered effective during initial displacement of the manual means for applying fluid pressure from said source to the motor cylinder, and a free piston intermediate the source and the motor cylinder and means for positively limiting the stroke thereof whereby the free piston forms a volumetric displacement metering device to predetermine the volume displaced from the source and the volume displaced to the motor cylinder.

2. In a hydraulic motion transmitting system for brakes or the like the combination with a motor cylinder for applying the brake, power-operated means for displacing a predetermined quantity of liquid into the motor, manual means for displacing variable amounts of liquid into the motor cylinder, said power-operated means comprising a source of pressure fluid, a free piston having one face in constantly open communication with the motor cylinder and an opposite face arranged to be selectively subjected to pressure fluid from said source, the available pressure at the source and the area of said faces being so chosen as to be capable of producing a pressure at the motor cylinder in excess of that ever required in normal operation of the brake, means for limiting the stroke of the free piston to a value only sufficient to take up slack in the brakes, and manually controlled means for connecting and disconnecting the source from said opposite face of the free piston.

3. In a hydraulic motion transmitting system for brakes or the like the combination with a motor cylinder for applying the brake, power-operated means for displacing a predetermined quantity of liquid into the motor, manual means for displacing variable amounts of liquid into the motor cylinder, said power-operated means comprising a source of pressure fluid, a free piston having one face in constantly open communication with the motor cylinder and an opposite face arranged to be selectively subjected to pressure fluid from said source, the available pressure at the source and the area of said faces being so chosen as to be capable of producing a pressure at the motor cylinder in excess of that ever required in normal operation of the brake, means for limiting the stroke of the free piston to a value only sufficient to take up slack in the brakes, and a valve actuated by said manual means for connecting and disconnecting the source from said opposite face of the free piston.

4. A slack take-up device for high-ratio, liquid column, braking systems comprising a source of fluid under pressure, and a volumetric displacement metering device comprising a free piston having one face in constantly open communication with the liquid column, and its opposite face in selective communication with the source, the area of said faces being so chosen with respect to pressure available at the source as to be capable of producing a pressure in said column at least equal to the maximum designed braking pressure, means for limiting the stroke of said piston to a value less than that necessary to produce a substantial pressure in the liquid column, and means for selectively connecting and disconnecting said source from said opposite face of the free piston.

5. A slack take-up device for high-ratio, liquid column, braking systems comprising a source of fluid under pressure, and a volumetric displacement metering device comprising a free piston having one face in constantly open communication with the liquid column, and its opposite face in selective communication with the source, the area of said faces being so chosen with respect to pressure available at the source as to be capable of producing a pressure in said column at least equal to the maximum designed braking pressure, means for limiting the stroke of said piston to a value less than that necessary to produce a substantial pressure in the liquid column, means for selectively connecting and disconnecting said source from said opposite face of the free piston, and means rendered effective when said piston is moved to fully retracted position for connecting the liquid column to a replenishing source.

6. A slack take-up device for high-ratio, liquid column, braking systems comprising a source of fluid under pressure, and a volumetric displacement metering device comprising a free piston having one face in constantly open communication with the liquid column, and its opposite face in selective communication with the source, the area of said faces being so chosen with respect to pressure available at the source as to be capable of producing a pressure in said column at least equal to the maximum designed braking pressure, means for limiting the stroke of said piston to a value less than that necessary to produce a substantial pressure in the liquid column, and means for selectively connecting and disconnecting said source from said opposite face of the free piston, said limiting means being adjustable to take up different amounts of slack to compensate for brake shoe wear and replacement.

KENNETH R. HERMAN.
RALPH L. TWEEDALE.